(12) United States Patent
Demmon et al.

(10) Patent No.: US 11,403,319 B2
(45) Date of Patent: *Aug. 2, 2022

(54) HIGH-AVAILABILITY NETWORK DEVICE DATABASE SYNCHRONIZATION

(71) Applicant: HEWLETT PACKARD ENTERPRISE DEVELOPMENT LP, Houston, TX (US)

(72) Inventors: Nick E. Demmon, Roseville, CA (US); Michael Zayats, Santa Clara, CA (US); Frank A. Reichstein, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 898 days.

This patent is subject to a terminal disclaimer.

(21) Appl. No.: 15/995,402

(22) Filed: Jun. 1, 2018

(65) Prior Publication Data
US 2019/0370376 A1 Dec. 5, 2019

(51) Int. Cl.
*G06F 16/00* (2019.01)
*G06F 11/00* (2006.01)
(Continued)

(52) U.S. Cl.
CPC .......... *G06F 16/27* (2019.01); *G06F 11/1658* (2013.01); *G06F 11/2023* (2013.01);
(Continued)

(58) Field of Classification Search
CPC .... G06F 16/27; G06F 16/273; G06F 16/2379; G06F 16/178; G06F 16/275; G06F 16/24;
(Continued)

(56) References Cited

U.S. PATENT DOCUMENTS

| | | | |
|---|---|---|---|
| 7,707,177 B2 * | 4/2010 | Bank | G06F 16/275 707/617 |
| 7,912,858 B2 * | 3/2011 | Fleck | G06F 11/1474 707/783 |

(Continued)

FOREIGN PATENT DOCUMENTS

| | | | |
|---|---|---|---|
| WO | WO2011060965 A1 * | 5/2011 | |
| WO | WO2011149994 A1 * | 12/2011 | |
| WO | WO2016036969 A1 * | 3/2016 | |

OTHER PUBLICATIONS

Minsheng Zhang et al., "Scalable name-based data synchronization for named data networking", IEEE INFOCOM 2017—IEEE Conference on Computer Communications, May 2017, pp. 1-9.*

(Continued)

*Primary Examiner* — Srirama Channavajjala
(74) *Attorney, Agent, or Firm* — Nolte Intellectual Property Law Group (57) ABSTRACT

A high-availability network device database synchronization technique for devices configured with multiple network controllers is disclosed. An HA database that contains information regarding a network state may not properly synchronize upon failure of a network component. For example, an HA switch typically has only two controllers, an active and a standby. If there is a loss of the active controller that causes a failover, changes in the network state may occur rapidly while the system is trying to recover (e.g., process the failover action). In part, because of the impact of the failover (e.g., failed communication paths) and rapidity of changes to network state while processing the failover, database changes may not be properly synchronized across all available database instances. Disclosed techniques provide reconciliation of database values using a mark and sweep technique on the "upside" of the failover and alter the "source of truth" for data value discrepancies.

18 Claims, 9 Drawing Sheets

(51) Int. Cl.
*G06F 16/27* (2019.01)
*G06F 11/20* (2006.01)
*G06F 11/16* (2006.01)

(52) U.S. Cl.
CPC ...... *G06F 11/2041* (2013.01); *G06F 11/2046* (2013.01); *G06F 11/2097* (2013.01); *G06F 16/273* (2019.01); *G06F 2201/80* (2013.01)

(58) Field of Classification Search
CPC ............ G06F 11/1658; G06F 11/2023; G06F 11/2097; G06F 11/2007; G06F 11/2074; G06F 11/2041; G06F 11/2046; H04L 41/0863; H04L 41/0869
See application file for complete search history.

(56) References Cited

U.S. PATENT DOCUMENTS

| | | | |
|---|---|---|---|
| 7,991,745 B2* | 8/2011 | Bourbonnais | G06F 16/27 |
| | | | 707/648 |
| 8,522,069 B2* | 8/2013 | Lammel | G06F 11/2097 |
| | | | 714/4.11 |
| 8,862,936 B2 | 10/2014 | Lee et al. | |
| 9,703,814 B1 | 7/2017 | Shams et al. | |
| 9,819,540 B1* | 11/2017 | Bahadur | H04L 45/50 |
| 10,585,881 B2* | 3/2020 | Colrain | G06F 16/84 |
| 11,037,150 B2* | 6/2021 | Van Os | G06Q 20/322 |
| 2002/0059279 A1* | 5/2002 | Kim | G06F 11/2074 |
| 2005/0210081 A1* | 9/2005 | Fleck | G06F 11/1474 |
| 2007/0011298 A1* | 1/2007 | Givoly | G06Q 30/02 |
| | | | 709/223 |
| 2008/0301199 A1* | 12/2008 | Bockhold | G06F 11/2023 |
| 2011/0179305 A1* | 7/2011 | Lammel | G06F 11/2033 |
| | | | 714/E11.071 |
| 2011/0246418 A1* | 10/2011 | Piwonka | G06F 11/006 |
| | | | 707/622 |
| 2012/0030508 A1* | 2/2012 | Vivian | G06F 11/20 |
| | | | 714/6.3 |
| 2014/0059529 A1* | 2/2014 | Banavalikar | G06F 8/656 |
| | | | 717/170 |
| 2014/0129873 A1* | 5/2014 | McGill | G06F 11/2002 |
| | | | 714/4.11 |
| 2014/0351432 A1* | 11/2014 | Koponen | H04L 43/0823 |
| | | | 709/224 |
| 2015/0199415 A1* | 7/2015 | Bourbonnais | G06F 16/27 |
| | | | 707/615 |
| 2015/0347250 A1* | 12/2015 | Kim | G06F 11/2048 |
| | | | 714/4.11 |
| 2016/0077752 A1 | 3/2016 | Vannin et al. | |
| 2017/0177658 A1 | 6/2017 | Lee et al. | |
| 2017/0344444 A1* | 11/2017 | Costa-Roberts | H04L 41/0654 |
| 2017/0351589 A1* | 12/2017 | Watanabe | G06F 11/2069 |

OTHER PUBLICATIONS

Dongeun Suh et al., "Toward Highly Available and Scalable Software Defined Networks for Service Providers", IEEE Communications Magazine ( vol. 55, Issue: 4, Apr. 2017), pp. 100-107.*
https://www.juniper.net/documentation/en_US/junos/topics/task/configuration/junosxmlprotocolconfigurationcommittingandsynchronizing.html; May 29, 2018; 9 pages.

* cited by examiner

HIGH-AVAILABILITY NETWORK DEVICE DATABASE SYNCHRONIZATION

BACKGROUND

In the field of network computing, database synchronization refers to keeping multiple copies of data on different devices consistent with each other any time there is a change to a data value. Database synchronization may sometimes be referred to as database replication. Database synchronization may be needed, in part, because in a typical distributed database architecture, data is spread (e.g., distributed) across multiple database instances. A database instance generally refers to a copy of the database and a copy of a database may also be referred to as a repository or data store. In some cases, the term "database instance" may refer to a process controlling access to a data store, however, this distinction between the process and the copy of data is typically clear from the context in which the term is used. Databases are distributed for several reasons that include, but are not limited to, data redundancy, distributed performance, and, in general, overall reliability and availability of data in case of failure of a primary database. However, distributing data introduces possible concerns, including but not limited to, data security, data integrity (e.g., consistency of internal pointers within a database and across multiple instances), and the above-mentioned data synchronization issues. In general, if there is a discrepancy across multiple database instances (e.g., caused by a partial or in-progress synchronization of a value change), a defined (possibly implementation specific) process may be used to determine which repositories have the "correct" current value.

In a distributed network application or environment, different clients may be updating different database tables and/or columns concurrently. In some database synchronization schemes, replication happens at the control of the original, primary, or master database based on a change to a value. That is, there may be a master data base that pushes out changes to other replicated copies (e.g., maybe read-only copies) of the database. Alternatively, any changes may be "broadcast" to all other instances upon any change in any database instance. In either case, changes are propagated as part of (or in, response to) a value being changed (e.g., "committed" after validation of an updated value is successful). Further, in some implementations, to address a data value conflict (e.g., non-consistent values of a database entry), a majority of the database instances may agree (e.g., vote or perform a conflict resolution process) on a particular value and then that value is considered to be the "current value". With this model, any individual database instance may become unavailable without loss of functionality. For example, a failure of a component, of a software program, or a manual action (e.g., maintenance) may cause a database instance to become unavailable. In a voting model, as long as there are a sufficient number of the instances available, the database continues to function for all clients (albeit at a possible reduced capacity).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

In the field of network computing, network connectivity between devices, compute nodes, blades, or frames of a scaleable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device there may be a processor, local memory, configuration information, and "current state" information, among other types of information. In any highly available network device there may be more than one network controller. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change.

When there are multiple controllers in a single device, portions of this network state information may be shared (e.g., synchronized) across a database instance associated with each of the controllers. That is, network controllers may have data that is of different "data types." The different data types, in this context, refer to whether or not the data is of a "type" that is pertinent for synchronization. Data values associated with information to be shared may be referred to as having a "shared data type." Also, there may be data values that are only pertinent to a single network controller and thus should not be synchronized. Data values associated with information to not be shared may be referred to as having a "local-only data type."

One implementation to control which data is synchronized (shared data type) and which data is maintained only locally (local-only data type) may be to logically segregate the data. Logical segregation may be accomplished using an attribute of data values/tables to indicate whether or not they are local-only or by storing local-only data values in a local only portion of the database. Another implementation may use actual physical segregation such that a first portion of physical memory is used to store values of a shared data type (for synchronization) while a second portion of physical memory is used for values having the local-only data type attribute. In either case or physical or logical segregation, disclosed techniques for data synchronization may address maintaining appropriate data values on at least one active and one standby controller to facilitate a failover condition.

In general, a switch may be thought of as a device in a computer network that connects together other devices (generically referred to as "nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

Switches, hubs, routers, etc. are examples of network communication devices that may benefit from the concepts of this disclosure. Other examples of network communication devices that may also benefit include, but are not limited to: wireless access points, remote access servers, bridges, brouters, etc. Also, some network communication devices do not fit into a single classification and may be hybrids of two classes of devices (e.g., a brouter is a bridge-router hybrid). In general, this disclosure represents an improvement to the art of network computing by providing techniques for data synchronization across multiple controllers of a high-availability network device (e.g., switch). Accordingly, disclosed techniques may be used to improve performance, security, and reliability of a network (e.g., a corporate infrastructure network).

Figure 1:
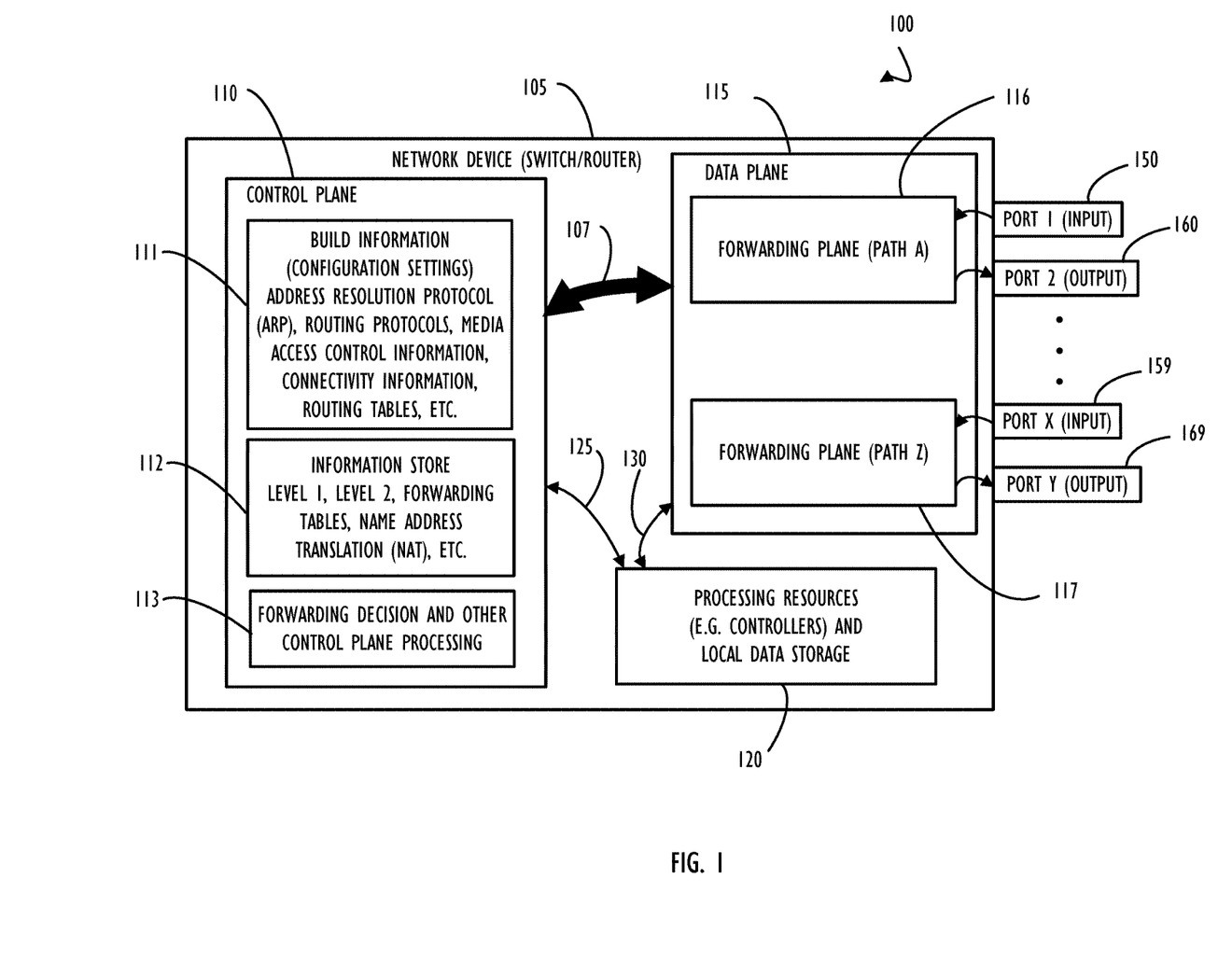
FIG. 1 is a functional block diagram representation of a network switch/router, according to one or more disclosed implementations.

Referring now to FIG. 1, a network device such as a switch/router 105 is illustrated as in block diagram 100. In general, a router has two types of network element components organized onto separate planes illustrated as control plane 110 and data plane 115. In addition, a typical switch/router 105 may include processing resources and local data storage 120. Depending on the capabilities of a particular switch/router 105 different types of processing resources and local storage may be present. In general, higher capacity router/switch 105 implementations will include substantial processing resources and memory while simpler (e.g., low capacity) devices will contain less internal resources.

Control plane 110, for example in a router may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115.

A router may also use a forwarding plane (e.g., part of the data plane 115) that contains different forwarding paths for information from different ports or different destination addresses (e.g., forwarding path A 116 or forwarding path Z 117). In general, the router forwards data packets between incoming (e.g., ports 150-159) and outgoing interface connections (e.g., ports 160-169), The router forwards data packets to the correct network type using information that the packet header contains matched to entries in the FIB supplied by control plane 110. Ports are typically bidirectional and are shown in this example as either "input" or "output" to illustrate flow of a message through a routing path. In some networks implementations, a router (e.g., network device 105) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1, bidirectional arrow 107 indicates that control plane 110 and data plane 115 may work in a coordinated fashion to achieve the overall capabilities of network device 105. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1, includes several example functional control blocks. Additional control blocks are possible depending on the capabilities of a particular implementation of a network device 105. Block 111 indicates that control plane 110 may have associated build information regarding a software version of control code that is currently executing on network device 105. In addition, that software version may include configuration settings to determine how network device 105 and its associated control code perform different functions.

Many different configuration settings for both the software and the device itself are possible and describing each is beyond the scope of this disclosure. However, the disclosed high-availability synchronization may be designed to capture configuration settings designated for synchronization while ignoring data values that are expected to maintain a local only value to accurately facilitate a failover between multiple controllers of a single network device. An example of a local-only values for a high-availability controller includes attributes of an operating system executing on an internal processor of the controller that are pertinent only to that instance of the operating system. That is, each processor on each controller (See FIG. 3) would have their own instance of the operating system and operating system attributes, in general, would not need to be shared. Block 111 further indicates that different types of routing information and connectivity information may be known to network device 105 and control plane 110. Block 112 indicates that an information store may be accessible from control plane 110 and include forwarding tables or NAT information as appropriate. Block 111 indicates that control plan 110 may also be aware of forwarding decisions and other processing information. Although FIG. 1 illustrates these logical capabilities within control plane 110 they may actually be implemented outside of, but accessible to, control plane 110.

Figure 2:
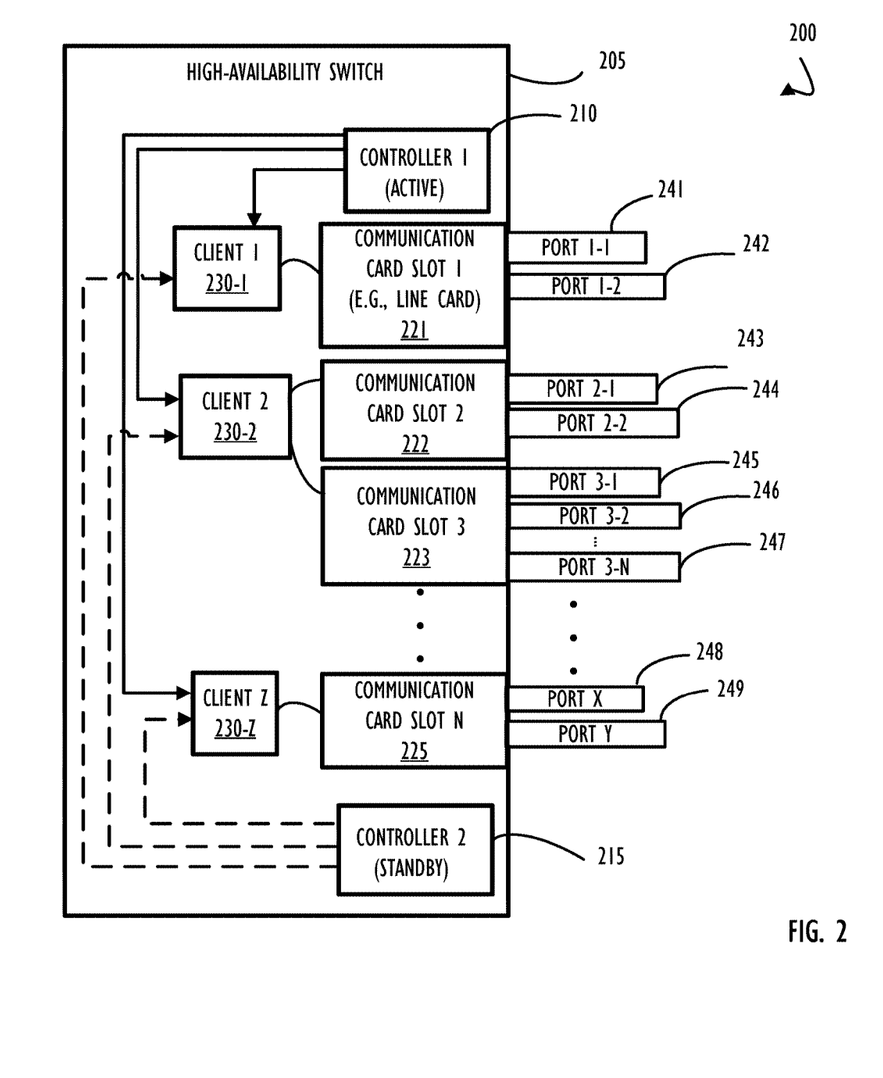
FIG. 2 is a block diagram representing functional modules and functional components of a high-availability switch, according to one or more disclosed implementations.

Referring now to FIG. 2, an example of a high-availability switch 205 is illustrated in block diagram 200. High-availability switch 205 is illustrated with two controllers. Controller 1 (210) is identified as the "active" controller and Controller 2 (215) is identified as the "standby" controller. As explained in more detail below, a high-availability switch, such as high-availability switch 205, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached. Failover may be automatic or manual and will be discussed in more detail below. In general, failover at a high level refers to the active and standby switching roles so that the standby becomes the active and the active (typically after restarting) becomes the standby.

High-availability switch 205 also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 205. Other connections and connection types are also possible (e.g., cable connection). Also, in FIG. 2, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices connected to that switch, a number of communication client applications may be executing on a given switch. Client applications executing on a switch may assist in both communication to connected clients and configuration of hardware on the switch (e.g., ports of a line card). In some cases, client applications are referred to as "listeners," in part, because they "listen" for a communication or command and then process what they receive. For high-availability switch 205, an example client application is client 1 (230-1) which is illustrated to support communication from either the active or the standby controller to devices connected through Card Slot 1 (221).

A second example client application in FIG. 2 is client 2 (230-2) which is illustrated to support communication from either controller to both of Card Slot 2 (222) and Card Slot 3 (223). Finally, client Z (230-Z) is illustrated to support communication from both controllers to Card Slot N (225). Dashed lines in block diagram 200 from standby controller 2 to client applications indicate that the standby controller may be communicatively coupled to a communication card slot via a client application but may not be transmitting significant data because of its standby status. Solid lines in block diagram 200 from active controller 1 to client applications indicate an active status with likely more communication taking place. Also note that a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

Figure 3:
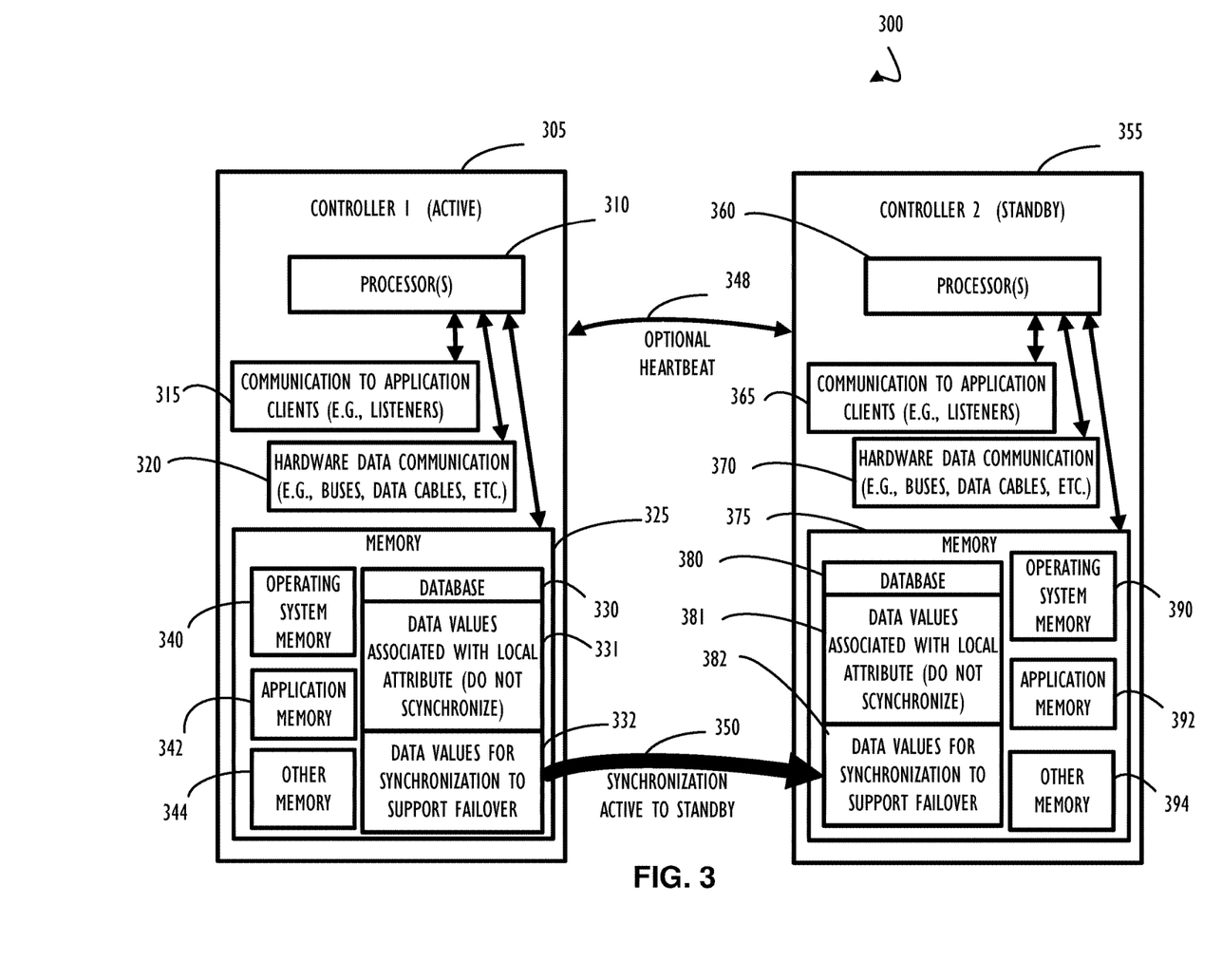
FIG. 3 is a block diagram representing an example high-availability switch architecture including further details for an active and a standby controller that may be configured to support a synchronization and failover capability, according to one or more disclosed implementations.

Referring now to FIG. 3, block diagram 300 illustrates an example high-availability switch (e.g., high-availability switch 205) architecture including further details for an active and a standby controller that may be configured to support a synchronization and failover capability, according to one or more disclosed implementations. In block diagram 300, controller 1 (305) is illustrated as the active controller and controller 2 (355) is illustrated as the standby controller. As mentioned throughout this disclosure, that designation (or role) of active or standby may change over time due to a failover action. Failover actions may be manually initiated (e.g., to perform system maintenance or alter network configuration) or may be automatically initiated (e.g., as a response to hardware or software failure). One example automatic failover initiation cause might be a loss of communication (e.g., optional heartbeat 348) between the active and the standby controller. For example, if the standby controller does not receive a heartbeat message within a pre-determined amount of time, the standby controller may consider the active controller non-functional and attempt to assume the active role by initiating a failover of the switch (e.g., high-availability switch 205). Another example of an automatically initiated failover may be based on a condition of loss of communication to the switch from one or more clients of the switch. In either case, the failover action may be initiated as a "recovery" action to prevent an extended network outage of the switch or devices connected to the switch.

As illustrated in FIG. 3, each of controller 1 (305) and controller 2 (355) include one or more processors 310 and 360, respectively. Processors within a controller may execute an operating system (not shown) to execute functions necessary to support operation of an associated controller. Note that multiple controllers typically have individual instances of their supporting operating system. That is, the operating system for a controller executes locally on the controller. Each of controller 1 (305) and controller 2 (355) are also illustrated to include functional block 315 and 365, respectively. Functional blocks 315 and 365 represent that each controller may have an association to multiple client applications (e.g., listeners) as described above for FIG. 2.

Continuing with FIG. 3, each of controller 1 (305) and controller 2 (355) are illustrated to include functional block 320 and 370, respectively. Functional blocks 320 and 370 represent that each controller may have one or more types of hardware data communication available internally. For example, a controller may have one or more data busses or be connected to one or more data communication cables. Each of controllers 1 (305) and 2 (355) are illustrated to include a memory 325 and 375, respectively. Memory local to a controller may be used to support functionality of the controller. For example, memory 325 on controller 1 (305) includes an operating system memory 340, an application memory 342, an "other" memory 344, and a database memory 330. Similarly, memory 355 on controller 2 (355) includes an operating system memory 390, application memory 392, and other memory 394, and a database memory 380. Each of these memories may represent logical portions of a single memory or may be independent physical memories depending on implementation requirements. Further, these and different memory areas may be combined or segregated depending on design, security, reliability, cost, or other factors.

As illustrated in FIG. 3, database memory 330 on controller 1 305 includes an area for local-only data values 331 that are not synchronized between controllers. Database memory 330 on controller 1 305 also includes an area of memory (e.g., synchronization memory 332) that may store information designated for synchronization to controller 2 (355) and any other standby controllers (not shown). Database memory 380 in controller 2 (355) is similarly divided into an area for local-only data values 381 and data values for synchronization 382. Uni-directional arrow 350 indicates that data values from the active controller data synchronization area (e.g., 332 in this example) may be synchronized from active to standby and result in an update to memory area 382 on controller 2 (355). Note that if a failover condition is responded to, the active and standby roles of each controller would be reversed and the direction of arrow 350 would be changed to point from the new active to the new standby. Also, as discussed above, synchronization of data values is performed for only data values that may be needed for the standby controller to become the active controller and not for values that are internal to an active controller. Examples of values that are likely to be synchronized, are those values that relate to network state, routing information, port status, and in general, hardware status of all elements of the switch that are not isolated to the active controller.

Figure 4A:
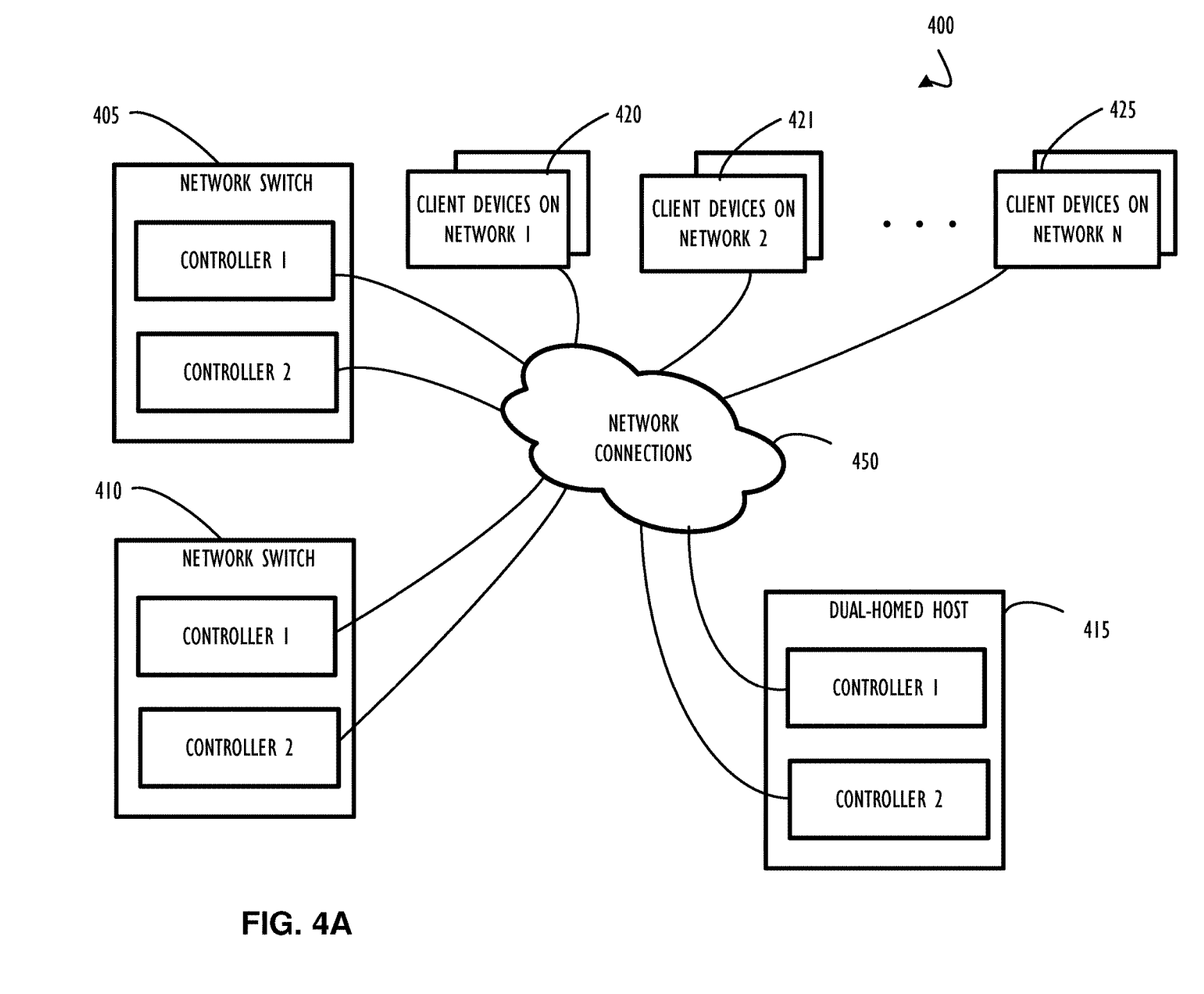
FIG. 4A is a block diagram representation of multiple switches, a dual-homed host, and several network clients connected via a network, according to one or more disclosed implementations.

Referring now to FIG. 4A, block diagram 400 illustrates multiple switches (network switch 405 and network switch 410), a dual-homed host 415, and several network clients (e.g., clients on network 1 (420), clients on network 2 (421), and clients on network N (425)) connected via a network as illustrated by network connection cloud 450, according to one or more disclosed implementations. A dual-homed host, such as dual-homed host 415, refers to a host computer that has more than one network interface (and network connection) such that it may have high-availability to external networks in a similar manner to that of a high-availability switch having dual controllers. Also, in block diagram 400, network connections are represented as network connections cloud 450 to illustrate that there are many different ways to implement a network. For example, networks may have different topologies (e.g., bus, ring, mesh, star, tree, etc.). Also, networks may be implemented using different technologies for the physical layer (e.g., of the Open Systems Interconnection (OSI) model). Network communication devices may be used to interconnect different topologies of networks and types of networks to allow devices having many different types of network connections to communicate with each other.

Figure 4B:
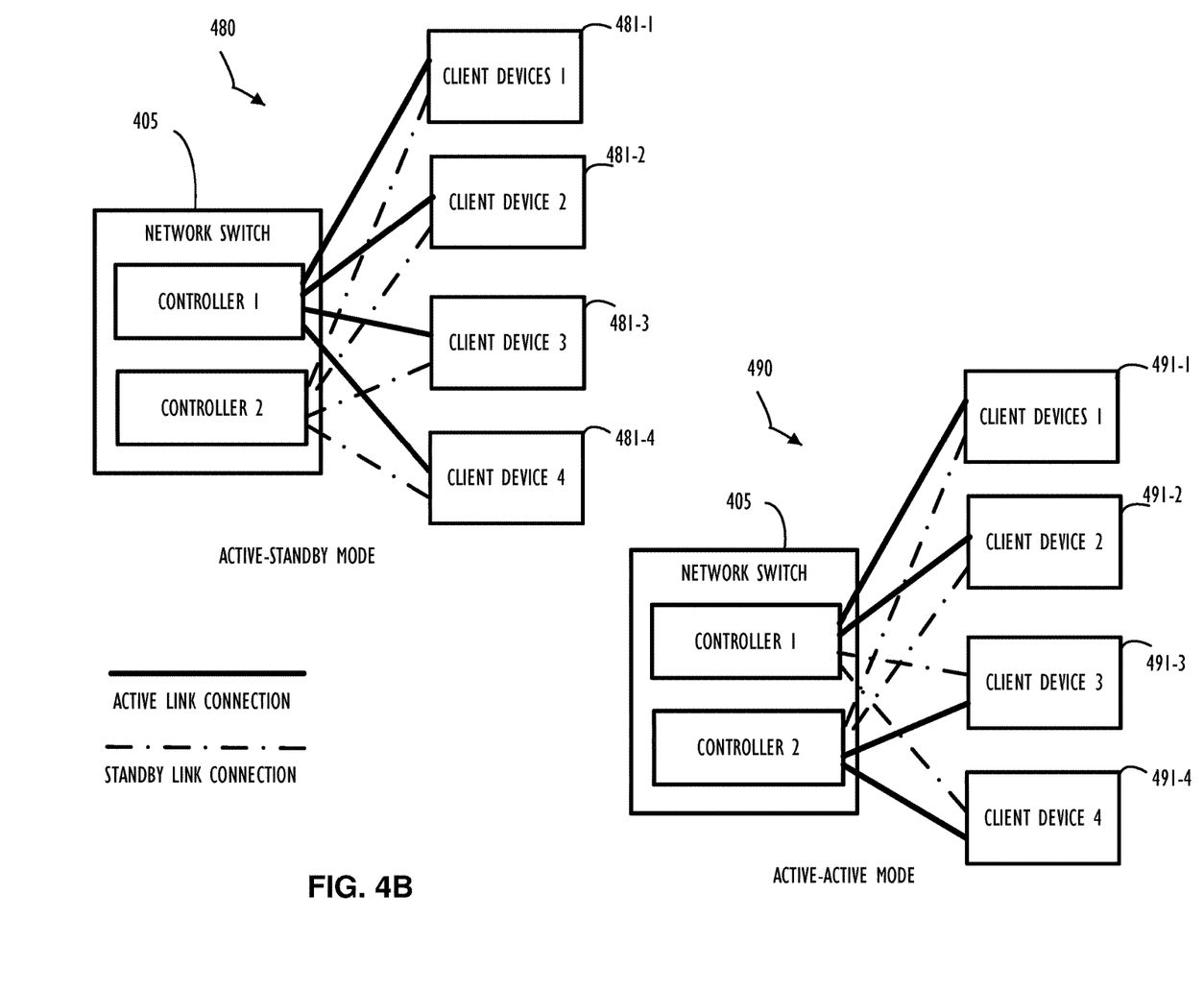
FIG. 4B includes two functional block diagram representations to illustrate at least two different operation modes of a high-availability switch having multiple controllers, according to one or more disclosed implementations.

FIG. 4B includes two functional block diagrams 480 and 490 illustrating two different operational modes of a high-availability switch having multiple controllers, according to one or more disclosed implementations. Block diagram 480 illustrates an "Active-Standby" configuration similar to that illustrated in FIG. 2. Block diagram 490 illustrates and "Active-Active" configuration where load is distributed across two controllers and neither controller has a "dedicated" role (when not in a failure recovery condition).

An Active-Standby configuration (block diagram 480) means that a first controller, in this example Controller 1 of switch 405, is providing communication to all attached clients while a second controller, in this example Controller 2 of switch 405, is largely idle and poised to assume an active role if required. This is further illustrated by the solid line active link connection from controller 1 to each of client device 1 (481-1), client device 2 (481-2), client device 3 (481-3), and client device 4 (481-4). Dashed lines indicate a standby link status between controller 2 to each of these same client devices. To support high-availability configurations, controller 2 may remain synchronized and available so that it can take over the active role from controller 1 should a failover condition arise. Once controller 2 has assumed the active role (e.g., after failover), controller 1 may be restarted and assume a standby role until there is a failure of controller 2, for example. In other implementations, once controller 1 is available again it may "assume" the active role from controller 2 and allow controller 2 to return to its "normal" operating role of standby. Different implementations are possible.

An Active-Active configuration (block diagram 490) means that the first controller and the second controller share the active communication responsibility, and each performs standby responsibility for the other's active links. This is further illustrated by the solid line active link connection from controller 1 to each of client device 1 (491-1) and client device 2 (491-2), with a dashed line connection to indicate a standby link status to each of client device 3 (491-3) and client device 4 (491-4). To mirror that configuration and provide connectivity, controller 2 is illustrated to have an active link (solid line) to each of client device 3 (491-3) and client device 4 (391-4) and a dashed line to indicate a standby link status between controller 2 to each of client device 1 (391-1) and client device 2 (391-2). This type of configuration may provide better throughput for network switch 405 but may introduce a degradation of "standard" service when in a failure condition (i.e., a single controller must support all active links). In contrast, the active-standby mode discussed above may not have any performance impact when operating in a failover state, in part, because the switch may have been designed with capacity to support all clients from a single controller. The configuration of block 490 may be implemented when availability is a concern, but the network designers intend for there to be a potentially slower throughput when something has failed. That is, clients still have a connection, but it is not as fast (possibly). Again, different implementations are possible and depending on an overall state of a network, different devices (e.g., switches and routers) may automatically alter their configuration (e.g., mode) to adjust to dynamic network requirements.

Figure 5:
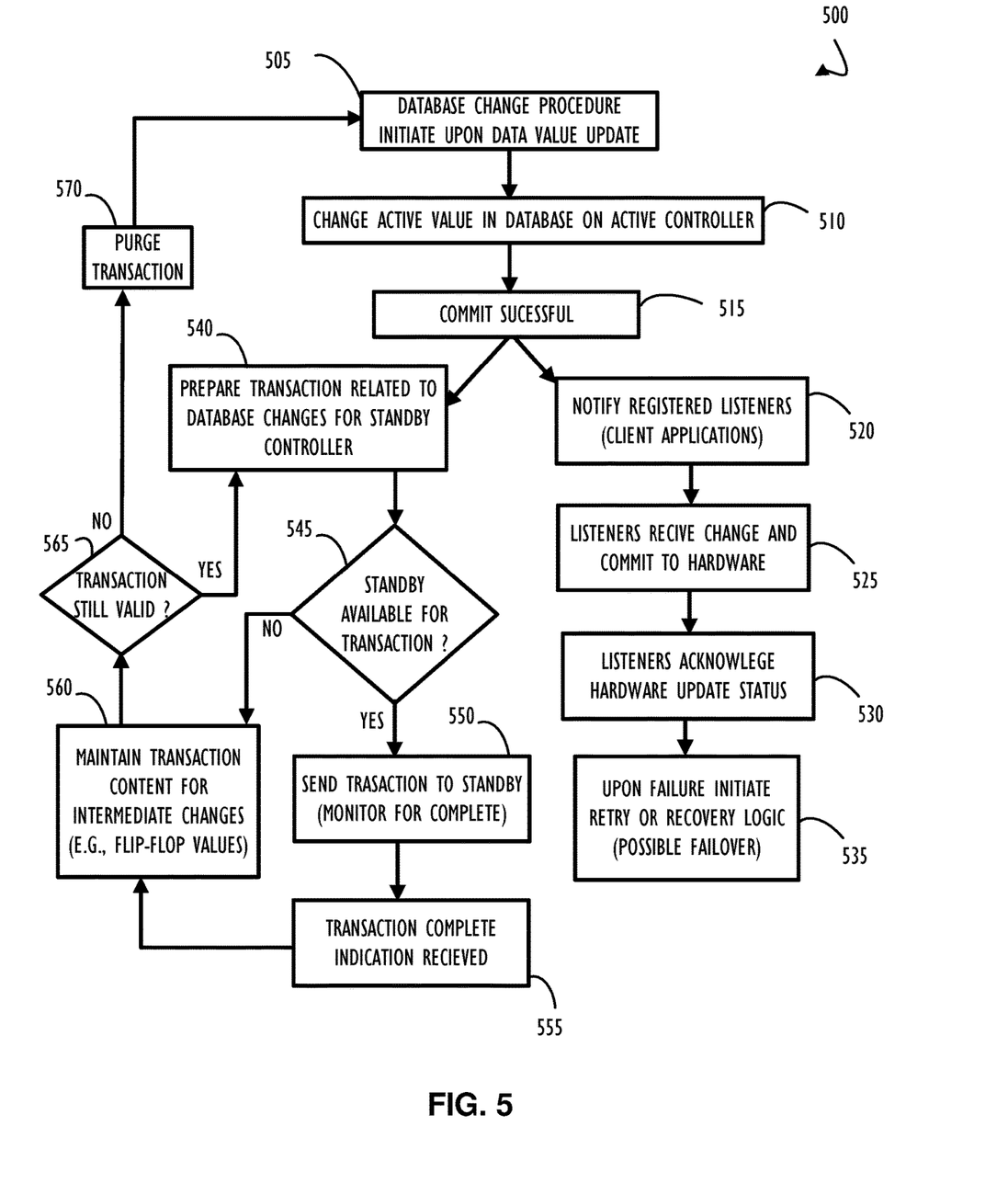
FIG. 5 is a flow chart representing a possible method to support network communication and database synchronization between the active and standby controllers of a switch, according to one or more disclosed implementations.

FIG. 5 is a flow chart representing a possible method 500 to support network communication of a switch (e.g., high-availability switch 205) and database synchronization between the active and standby controllers of that switch, according to one or more disclosed implementations. Method 500 begins at block 505 where a database change procedure may begin. The database change procedure may be "triggered" or initiated based on an update to a data value that requires synchronization (e.g., a data value in a synchronization memory area of an active controller such as area 332 from FIG. 3) as indicated by block 510. Database updates and value changes may go through a process executing on the active database controller to support an instance of the database (e.g., a database support program/application/function). Block 515 indicates that a commit to the active database is determined to be successful. In database terminology, a "commit" refers to a successfully stored update to a database value. After a successful commit at block 515, two parallel activities may be initiated (or they may be performed serially depending on the implementation). A first, at block 520 to notify any registered listeners (client applications such as client 1 (231) of FIG. 2) of the change and a second at block 540 to prepare a transaction related to database changes for synchronization to a standby controller. Continuing from the path of block 520, flow continues to block 525 where listeners may receive the change and commit the change to hardware (if appropriate). A change to hardware may be a change in hardware state such as bringing a port "up" or taking a port off-line "down." At block 530 listeners may be configured to acknowledge that the hardware commit (e.g., hardware update) was successful. Alternatively, block 535 indicates that if the hardware commit is not successful a recovery action may be initiated. A recovery action may include a retry or some other sort of recovery logic and possibly even initiation of a failover.

Returning to block 540, a commit has been successful (from block 515) and a database "transaction" has been prepared for the standby controller. In this example, a transaction refers to one or more data value changes that may be "bundled" together such that the standby controller may receive multiple updates as a single atomic update. Some implementations ensure that transactions, once completed, leave the database in an internally consistent state and no errors have been introduced by a "partial" update. Decision 545 indicates that a check may be made to determine if the standby controller is currently available to receive a transaction. For example, if the standby controller (and its database support program) is still processing a previous transaction then it may not yet be available for another transaction. If the standby controller (or its database) is not available ("NO" prong of decision 545) flow continues to block 560 which will be discussed below.

However, if the standby controller is available ("YES" prong of decision 545), flow continues to block 550 where the current transaction may be sent to the standby controller. Block 555 indicates that that the standby controller has completed a received transaction, and flow continues to block 560.

Block 560 indicates that transactions may be maintained for a period of time (e.g., while standby controller is busy or for a buffering period) and any changes received over that period of time may be consolidated such that any "flip-flop" values are not sent to the standby controller. For example, if a port is going up and down repeatedly and frequently, transferring the current port state may be considered unnecessary. Other buffering conditions may be implemented to ensure an efficient synchronization process between the active and the standby.

Flow then continues to decision 565 where a determination may be made as to if the transaction is still valid. For example, if only a flip-flop of values has occurred, synchronization may not be necessary as the standby database should already reflect the "current" value. Accordingly, if the transaction is no longer necessary (the "NO" prong of decision 565) flow continues to block 570 where the transaction may be purged. Flow then returns to block 505 to wait for another data value change. However, if the transaction is still valid ("YES" prong of decision 565) flow returns to block 540 where the transaction may be prepared (e.g., updated as necessary or simply used if still current) and sent to the standby controller. In some implementations, to maintain internal database consistency, all transactions are completed on the standby database in the same order for which the transactions were applied to the active database. In this manner, changes to any data values in an active controller database that are associated with a network state or switch hardware, for example, may be efficiently maintained on the standby controller and in the standby controller database.

Figure 6:
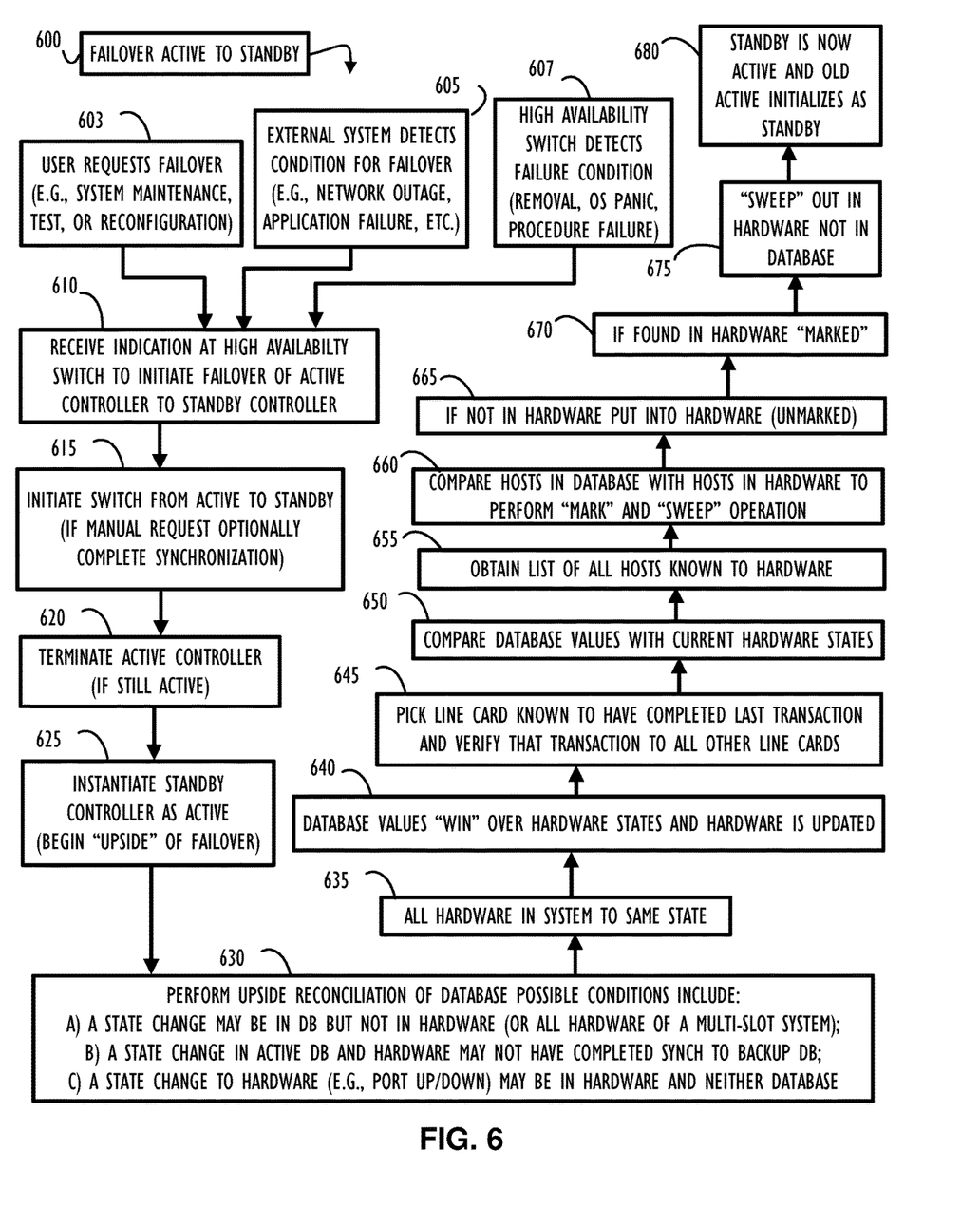
FIG. 6 is a flow chart representing a possible method to support failover from the active to, the standby controller and perform database reconciliation (if necessary) on the upside of the failover, according to one or more disclosed embodiments.

FIG. 6 is a flow chart representing a possible method 600 to support failover from the active to the standby controller and perform database reconciliation (if necessary) on the upside of the failover, according to one or more disclosed embodiments. Method 600 begins when a request for failover is received. There are several reasons a failover request may be received, and three examples are illustrated in method 600, other reasons may also exist. Block 603 indicates that a failover request may come from a user such as a system administrator wanting to perform maintenance, perform some testing, or implement a reconfiguration, for example. Block 605 indicates that a failover request may be initiated as a result of an external system (e.g., external to the switch). For example, the external system or an enterprise device monitoring system may detect a condition that indicates a failover recovery action may be beneficial to address the detected condition (e.g., network outage, or application failure). Block 607 indicates that the switch itself (e.g., high-availability switch 205) may detect a condition that indicates a failover recovery action may be helpful. For example, a heartbeat failure, removal of a controller, an operating system panic, or a key procedure failure (e.g., database support function failure), among other possibilities. In any of these three cases, flow continues to block 610 where the indication of failover request is received at the high-availability switch.

In response to the request for failover (from block 610) flow continues to block 615 where the switch (or other high-availability device) may initiate the failover from active controller to standby controller. In some cases, if the request is manual, the switch and failover process may be configured to delay acting on the request for a period of time. The delay may allow any in-process synchronization transactions to be completed. If this delay type configuration is implemented, the switch may only wait for a short period of time, to address any outstanding transactions, prior to forcing the failover. If forced the failover may then take place regardless of the transaction state. Block 620 indicates, that if the active controller still believes it is in an active state, the active controller may be terminated (e.g., shutdown through a hardware action or additional software command) to cause the active controller to cease further communication and processing. Block 625 indicates that the standby controller may now be designated as the active controller and processing can begin the "upside" of the failover action.

To perform the upside of the failover (i.e., make standby controller the active), block 630 indicates that upside reconciliation of the database on the standby controller may be performed. Values in the standby database may be in at least one of three possible "conditions" based on activity that caused the failover. A first condition may be that a state change may be stored in the standby database but not in the hardware (or possibly all hardware in a multi-slot system). A second condition may be that a state change that was successfully stored in the previous active DB and was implemented in the hardware has not completed the synchronization process to the previous standby (now active) controller. For example, a transaction stuck in block 540 of FIG. 5. Finally, a third condition may be that a state change to hardware may be in the hardware but not in either database. For example, a port may have gone up or down just prior to the failover and the port status was not yet committed to the previously active database (and clearly not synchronized).

To address each of the above three conditions, flow of method 600 continues to block 635 where all hardware in the system (e.g., switch) may be set to a consistent state. For example, hardware updates that are in only some of the hardware may be made known to all of the hardware. Block 640 indicates that, for the reconciliation process, database values "win" over hardware states and hardware states will be changed to match the database values. Block 645 indicates that, in order to make all hardware consistent, a line card known to have completed the last transaction may be selected. Once selected, information from that line card may be used to make all other line cards consistent with that transaction (i.e., make all hardware consistent with other hardware). Block 650 indicates that database values may be compared with current hardware states (hardware has been made consistent with each other). Block 655 indicates that a list of all known hosts (e.g., hosts in the network supported by this switch) may be obtained from hardware. Block 660 indicates that a comparison of hosts in the database (on the new active/old standby) versus hosts in the hardware may be performed using a mark and sweep operation. Block 665 indicates that if a host is not in the hardware (but is in the database) the host will be put into the hardware and left "unmarked" in the database. Block 670 indicates that, if a host is in both the database and the hardware, the database entry will be "marked." Block 675 indicates that a sweep operation will remove everything from the hardware that is not in the database. Finally, example method 600 completes with the old standby controller as the new active controller and the old active controller may be restarted to become a new standby controller (e.g., they switch roles via the failover).

In the above process, certain states of the network may not be entirely accurate on the standby switch for various reasons. However, because of how network communication and configuration information is broadcast throughout a network, the new active may learn the current state of the network through its normal course of operation and likely not cause significant network impact.

Figure 7:
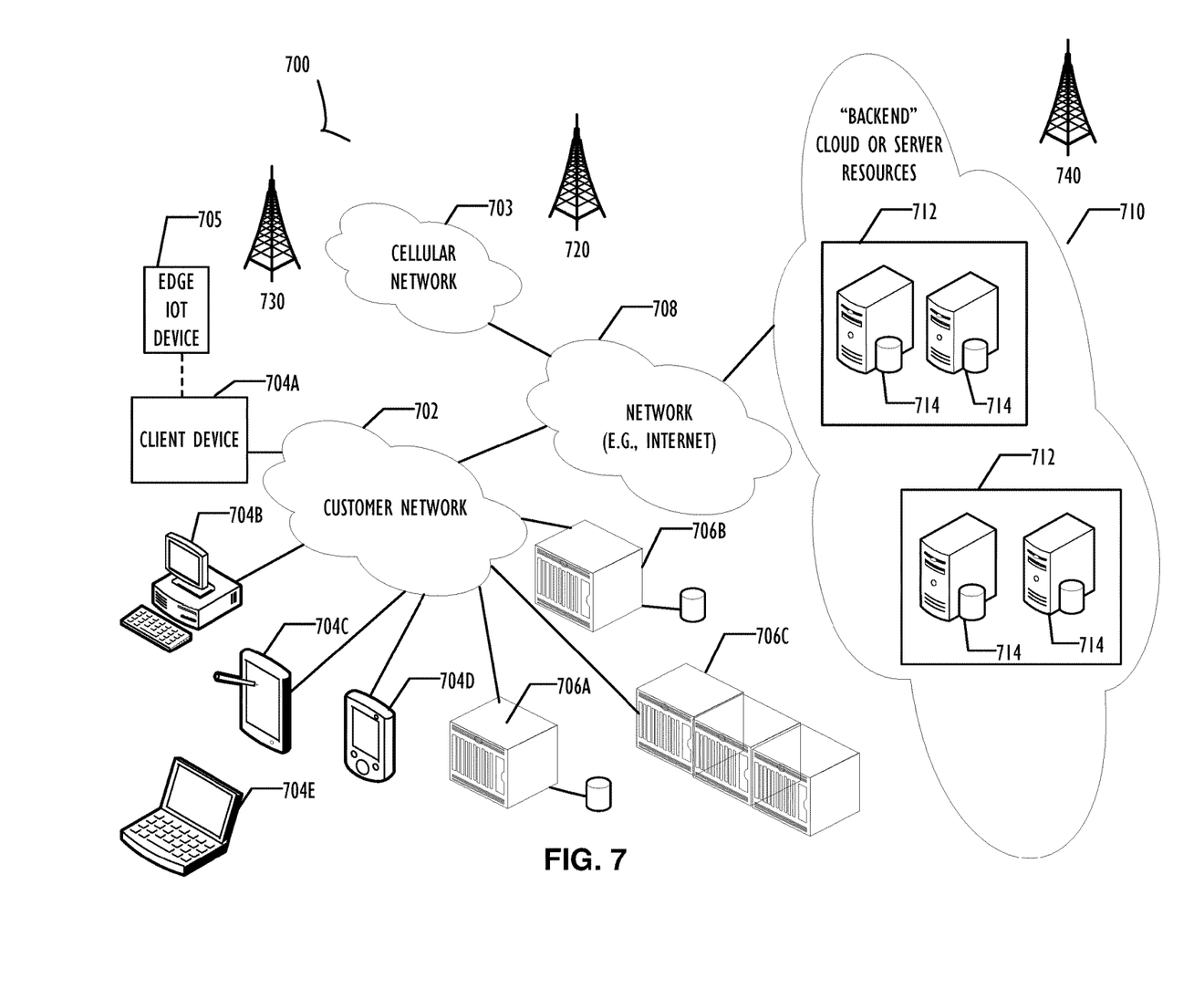
FIG. 7 represents a computer network infrastructure that may be used to implement all or part of the disclosed synchronization technique for a high-availability network device, according to one or more disclosed embodiments.

FIG. 7 represents a computer network infrastructure 700 that may be used to implement all or part of the disclosed high-availability database synchronization technique for a high-availability switch or other network device, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability switches or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
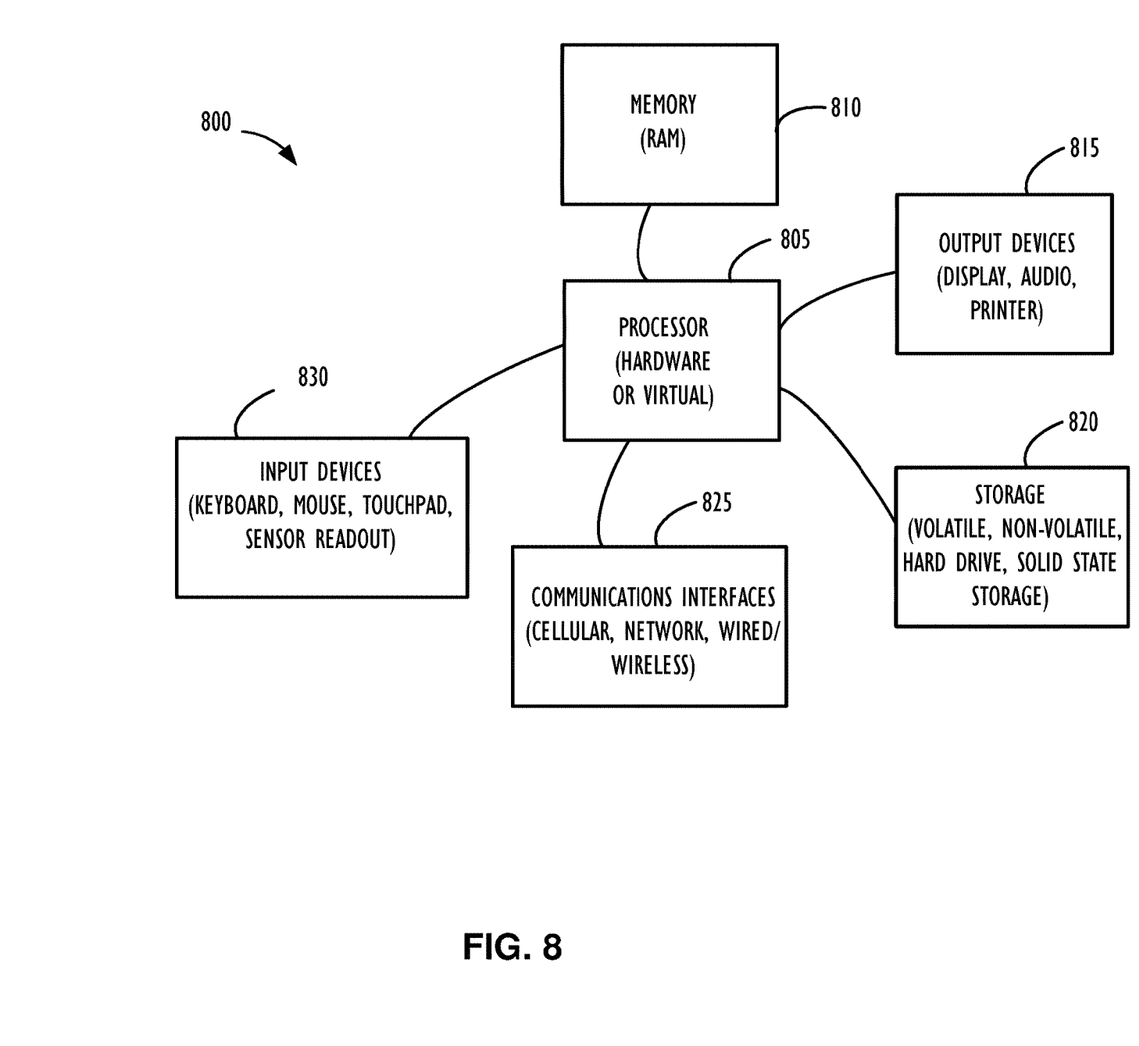
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer device, comprising:
   a first network controller communicatively coupled to a first network; and
   a second network controller communicatively coupled to the first network and to the first network controller; and
   a first line card communicatively coupled to the first network controller and the second network controller, wherein
   the first network controller comprises:
      a first processing unit; and
      a first memory communicatively coupled to the first processing unit, wherein the first memory stores instructions, that when executed by the first processing unit, causes the first processing unit to perform a first network device database synchronization function between an active network controller and a standby network controller, the first network device database synchronization function configured to:
         execute a first client application configured to interface the first line card with the first network controller;
         execute a first database support process configured to maintain a first database comprising a plurality of value types stored in the first memory, wherein the first database comprises a first value type pertaining to a plurality of devices on the first network and a second value type pertaining to local-only information pertaining to the first network controller;
   the second network controller comprises:
      a second processing unit; and
      a second memory communicatively coupled to the second processing unit, wherein the second memory stores instructions, that when executed by the second processing unit, causes the second processing unit to perform a second network device database synchronization function between an active network controller and a standby network controller, the second network device database synchronization function configured to:
         execute a second client application configured to interface the first line card with the second network controller;
         execute a second database support process configured to maintain a second database comprising the plurality of value types stored in the second memory, the second database support process further configured to update a first data value for a parameter associated with information from the first line card and of the first value type in the second database, the update responsive to a change in the first data value for the parameter in the first database.

2. The computer network device of claim 1, wherein the first client application and the second client application are a single client application configured to interface the first line card with both the first network controller and the second network controller concurrently.

3. The computer network device of claim 1, wherein each of the plurality of value types is segregated using a logical segregation, the logical segregation based on an attribute associated with each data value.

4. The computer network device of claim 1, wherein the plurality of value types are segregated using a logical segregation, the logical segregation based on storing different ones of the plurality of value types in segregated portions of a shared memory.

5. The computer network device of claim 1, wherein the plurality of value types are segregated using a physical segregation, the physical segregation based on storing different ones of the plurality of value types in independent memory storage devices.

6. The computer network device of claim 1, wherein:
   the first network controller is configured as the active network controller and the second network controller is configured as the standby network controller; or
   the second network controller is configured as the active network controller and the first network controller is configured as the standby network controller.

7. The computer network device of claim 1, wherein the second database support process configured to update a data value for a parameter of the first value type in the second database responsive to changes in the data value for the parameter in the first database comprises the second database support function configured to process a first transaction received at the second database controller from the first database controller, the first transaction comprising multiple changes in data values of the first value type.

8. The computer network device of claim 7, wherein the second database support process is further configured to apply the multiple changes in data values of the first value type to the second database in an order consistent with application of the multiple changes to the first database.

9. The computer network device of claim 1, wherein the first database support process is further configured to:
   create a transaction representative of a change to a second data value of the first value type, the transaction sufficient for application of the change to the second data value to the second database; and
   send the transaction to the second network controller.

10. The computer network device of claim 1, wherein the first database support process is further configured to:
    create a transaction representative of a second change to a second data value of the first value type, the transaction sufficient for application of the second change to the second data value to the second database;
    buffer the transaction prior to initiating a send of the transaction to the second network controller;
    identify a third change to the second data value, the third change indicative of a flip-flop change; and purge at least a portion of the transaction responsive to the flip-flop change.

11. The computer network device of claim 1, further comprising:
  a third processing unit communicatively coupled to the first processing unit and the second processing unit; and
  a third memory communicatively coupled to the third processing unit, wherein the third memory stores instructions, that when executed by the third processing unit, causes the third processing unit to perform a failover function between the active network controller and the standby network controller, the failover function configured to:
    receive an indication of failover;
    verify termination of the active network controller; and
    initiate an action on the standby network controller to assume a role of active.

12. The computer network device of claim 11, wherein the failover function is further configured to:
  identify the indication of failover represents a manual request for failover;
  delay initiation of the manual request for failover for a period of time sufficient to complete at least one in-process transaction;
  terminate the active network controller; and
  provide verification of termination of the active network controller.

13. The computer network device of claim 11, wherein the failover function is further configured to:
  assume the role of active on a previously standby network controller by performing a network device database reconciliation function.

14. The computer network device of claim 13, wherein the failover function is further configured to:
  perform the network device database reconciliation function by ensuring all hardware has all available transactions committed and then performing a mark and sweep operation where database values have precedence over hardware values.

15. A non-transitory computer readable medium comprising computer executable instructions stored thereon that when executed by one or more processing units, perform a network device database synchronization method between an active network controller and a standby network controller, the method comprising:
  identify a first change in a first data value of a shared data type for an active network controller database, wherein the active network controller database comprises: a first value type of the shared data type which pertains to a plurality of devices on a first network to which the active network controller is communicatively coupled; and a second value type which pertains to local-only information associated with the active network controller;
  create a transaction including the first change;
  identify a second change in a second data value of the shared data type for the active network controller database;
  update the transaction to refer to both the first change and the second change;
  identify a third change in a second data value of the local-only data type for the active network controller database;
  prevent the third change from being referred to in the updated transaction;
  responsive to determining that the updated transaction is valid and that synchronization is necessary, send a valid transaction to the standby network controller for application to a standby network controller database; and
  perform a failover function between the active network controller and the standby network controller by:
    delaying initiation of a manual request for failover for a period of time sufficient to complete at least one in-process transaction;
    terminate the active network controller; and
    provide verification of termination of the active network controller; and
    assume a role of active on a previously standby network controller by performing a network device database reconciliation function.

16. The non-transitory computer readable medium of claim 15, wherein the method further comprises:
  creating a logical segregation of memory storage locations based on data value data types.

17. The non-transitory computer readable medium of claim 16, wherein creating a logical segregation of memory storage locations based on data value data types comprises checking an attribute associated with each data value prior to storing the each data value in a corresponding memory storage location.

18. The non-transitory computer readable medium of claim 15, further comprising computer executable instructions stored thereon that when executed by one or more processing units, perform the failover function between the active network controller and the standby network controller, the failover function configured to:
  receive an indication of the failover;
  verify termination of the active network controller; and
  initiate an action on the standby network controller to assume the role of active.

* * * * *